Patented Nov. 18, 1947

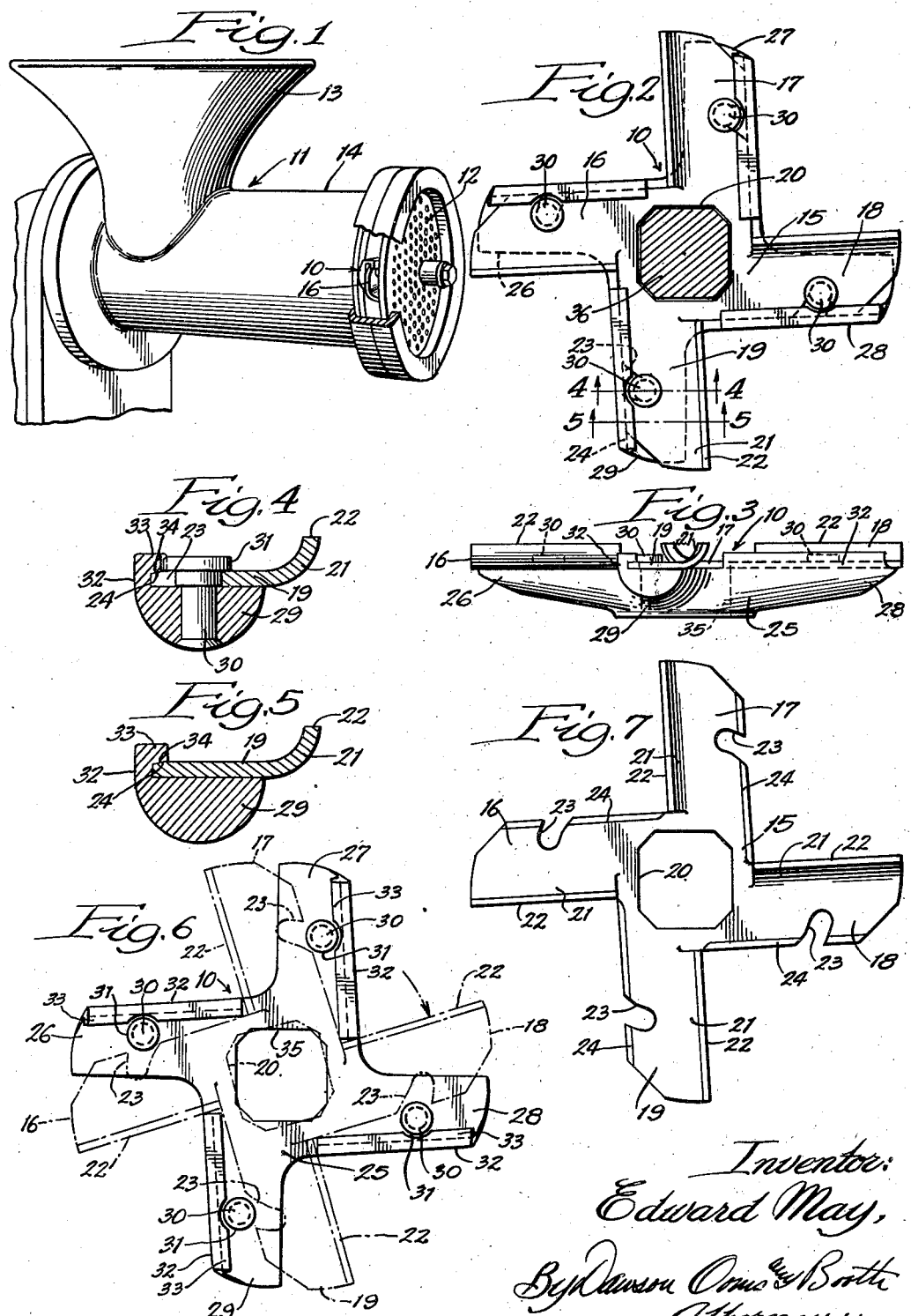

2,431,267

UNITED STATES PATENT OFFICE 2,431,267

KNIFE HOLDER FOR MEAT GRINDERS AND THE LIKE

Edward May, Fort Worth, Tex., assignor to Armour and Company, Chicago, Ill., a corporation of Illinois Application January 26, 1943, Serial No. 473,622

2 Claims. (Cl. 146—189)

This invention relates to a knife holder for a meat grinder and the like, and particularly to a holder for receiving a knife and supporting the same while in use.

An object of the invention is to provide a knife holder for a meat grinder and the like wherein a knife is mounted on the holder and firmly supported in engagement with the base of the holder, so as to minimize breakage of the knife in the grinding operation. Another object is to provide a knife holder structure in which the knife is releasably held in firm engagement with the base of the holder. Still another object is to prevent the accumulation or lodging of particles of meat or other material between the knife and the holder. Yet another object is to provide a holder for a knife for a meat grinder and the like wherein a substantial portion of the side of the blade of the knife is engaged by a member which holds the same against the base of the holder.

Other features and advantages will appear from the following specification and drawings, in which—

Fig. 1 is a perspective view of a meat grinder equipped with the knife holder of the invention; Fig. 2 is a plan view of the holder supporting a knife; Fig. 3 is an end elevational view of the holder with the knife in position thereon; Fig. 4 is a transverse sectional view along the line 4—4 of Fig. 2; Fig. 5 is a transverse sectional view along the line 5—5 of Fig. 2; Fig. 6 is a plan view of the holder and the knife showing the placing of the knife in position in the holder; and Fig. 7 is a plan view of the knife.

In the conventional knife holder for meat grinders, the holder includes studs or pins which project from the base of the holder and engage slots in the knife. Normally, each stud is equipped with an enlarged head which engages one side of the knife blade to hold the opposite side of the blade in engagement with the base of the knife holder. The enlarged head of the stud, of course, engages only a small portion of the surface of the side of the blade. In these prior art structures, there has been substantial breakage of the knives in the grinding operation. I have found that this breakage is due to a large extent to the manner in which the knives have been supported which results in a tendency of the meat and other materials to lodge between the knife and the holder causing excessive strain on the knife.

The present invention contemplates a holder in which the blade of the knife is held snugly and firmly against the base of the holder and the lodging of meat and other particles between the blade of the knife and the knife holder is substantially prevented. With such a knife holder, the breakage of knives in the grinding of meat has been greatly reduced.

In the embodiment of the invention specifically described herein, the knife holder 10 is mounted in the grinder 11 adjacent the conventional perforated plate 12 at the end thereof. The grinder is of the usual and well-known style, including an inlet hopper 13 and a tubular casing 14 through which the meat is fed to the knife.

The knife holder 10 may be constructed for use with any suitable type of knife and, as illustrated, is adapted to receive a knife 15 of the conventional type having four radially-extending blades 16, 17, 18 and 19 and a central aperture 20. As seen in Figs. 4, 5 and 7, each of the radial blades may be equipped with an upwardly turned forwardly-extending portion 21 and with a straight cutting edge 22 at the forward end thereof. Each of the radial blades may also be equipped with a slot 23 for receiving a stud carried by the knife holder. At the rear end, each of the blades may be provided with a rearwardly and downwardly beveled portion 24, as seen particularly in Figs. 4 and 5.

The knife holder 10 is provided with a base 25, which may include radially-extending portions 26, 27, 28 and 29 corresponding to the radially-extending blades of the knife. Each of the radially-extending portions of the base is equipped with a substantially flat upper surface on which the flat surface of the knife blade may be received. A stud 30 may be mounted on each of the radially-extending portions of the base of the holder 10, the stud 30 preferably being equipped with an enlarged head 31.

At the rear of the base 29, as seen particularly in Figs. 4 and 5, is an upwardly-extending wall 32 provided at its upper end with a flange 33 which extends forwardly over the flat surface of the base 29 in spaced relation therewith. The flange 33 is in substantially parallel relation with the surface of the base 29. Preferably, as shown, the lower surface of the flange 33 may be beveled slightly downwardly and rearwardly at 34, the bevel corresponding to the bevel 24 on the rear portion of the knife blade.

The radially-extending base portions 26, 27 and 28 may be of exactly the same construction as the base portion 29 and will, therefore, not be described in detail herein.

The holder 10 is equipped with a central aperture 35 which is adapted to register with the central aperture 20 in the knife 15. The central apertures in the knife and in the knife holder are preferably polygonal in shape so as to receive in drive relation a shaft 36 of substantially the same cross section shape, whereby the holder and the knife carried thereby may be rotated by rotation of the shaft.

As illustrated particularly in Fig. 6, the knife 15 may be mounted in the holder 10 by placing the knife on the holder 10 with the slots 23 adjacent the studs 30. The lower surface of the side of each of the knife blades is brought into engagement with the upper surface of the outwardly-extending radial portions of the base of the holder. The knife is then rotated in a clockwise direction, as indicated by the arrows in Fig. 6, and the shaft of each of the studs 30 is received within the groove 23 in the corresponding knife blade. The enlarged head 31 of each stud overlaps and overlies the body of the blade of the knife.

Each stud 30 when received within the groove or slot 23 in the corresponding knife blade prevents rearward movement of the blade and also prevents lateral movement of the blade in the groove formed between the flange 33 and the adjacent flat surface of the base. At the same time, the stud does not prevent the forward movement of the blade by which the knife may be released from the holder.

When the knife is brought into slidable engagement with the holder in the manner described, the rear portion of each of the blades 16, 17, 18 and 19 is received beneath the flange 33 on each of the corresponding base portions 26, 27, 28 and 29. The beveled portion 24 at the rear of each knife blade engages the beveled portion 34 of the flange 33. The rear surface of the knife blade in each case may engage the rear wall 32 of the base.

The knife 15 is thus received in releasable engagement with the holder 10, with the flange 33 overlying and engaging the upper side of each knife blade so as to maintain the blade in snug and firm engagement with the upper surface of the base of the holder. Preferably, the flange 33 extends throughout substantially the entire length of each radial base portion of the holder and thus engages substantially the entire length of each blade. In any event, the flange 33 should engage a major portion of the length of the blade. The studs 30 lock the knife against lateral movement with respect to the holder 10, while the enlarged heads 31 of the studs 30 aid in holding the knife blades in engagement with the base of the holder.

The holder carrying the knife is mounted on the shaft 36 by passing the shaft through the central apertures in the holder and the knife blade. The shaft 36 in the grinder is in the structure illustrated rotated in a counter-clockwise direction and rotation of the shaft will not cause the knife to be released from the holder.

With this construction, the lower side of each of the knife blades is maintained in tight engagement with the upper surface of the corresponding base portion, while the upper side of each of the knife blades is engaged by the flange 33 as well as by the enlarged head 31 of the stud 30. By reason of the snug firm engagement of the knife blade with the corresponding base portion, there is substantially no tendency for meat or other materials, such as bone particles, to be lodged between the lower surface of the knife blade and the upper surface of the base portion engaging the same. Moreover, the engagement of the flange 33 with a substantial portion of the upper surface of the knife blade distributes any strain which may be occasioned by any tendency of the blade to be moved upwardly against the flange. Breakage of knife blades with this knife holder is minimized, and the difficulties of the prior art constructions are obviated.

Although the invention has been described in connection with a specific embodiment, it will be apparent that changes and modifications may be made without departing from the spirit and scope of the invention.

I claim:

1. A rotatable knife holder for a meat grinder and the like adapted to receive and support a knife provided with a plurality of radially-extending blades, having flat side surfaces in substantially the same plane, each of said blades having an upwardly and forwardly extending leading cutting edge and a rearwardly opening groove therein, said holder comprising a base with radially extending coplanar flat surfaces for engaging and supporting the flat surfaces on the lower sides of said blades, each of said flat surfaces having a wall carried by said base extending upwardly at its trailing edge and adapted to engage the trailing edge of each blade, a flange carried by each of said walls extending forwardly in the direction of rotation and in spaced relation with respect to the adjacent flat surface of said base each of said flanges and the flat surface of the base opposite thereto providing therebetween a groove for releasably receiving the rear portion of one of the blades of said knife, and a stud extending upwardly from each of the flat surfaces of said base at an intermediate radial portion thereof and spaced substantially forwardly in the direction of rotation of said flange and wall for slidably receiving the groove in the adjacent blade to prevent rearward and lateral movement of the blade, each of said studs having an enlarged head for engaging the upper surface of the adjacent blade at a portion thereof spaced forwardly of said rear portion, said head being spaced from said flat surface in which the stud is mounted by a distance substantially the same as the thickness of the portion of the blade engaged thereby, whereby the blade is held in tight engagement between the head of the stud and the adjacent flat surface of the base.

2. A rotatable knife holder for a meat grinder and the like adapted to receive and support a knife provided with a plurality of radially-extending blades having flat side surfaces in substantially the same plane, each of said blades having an upwardly and forwardly-extending leading cutting edge and a rearwardly-opening groove therein and a rearwardly and downwardly beveled portion at the rear of the upper surface thereof, said holder comprising a base with radially extending coplanar flat surfaces for engaging and supporting the flat surfaces on the lower sides of said blades, each of said flat surfaces having a wall carried by said base extending upwardly at its trailing edge and adapted to engage the trailing edge of each blade, a flange carried by each of said walls extending forwardly in the direction of rotation and in spaced relation with respect to the adjacent flat surface of said base, each of said flanges and the flat surface of the base opposite thereto providing therebetween a groove for releasably receiving the rear portion of one of the blades of said knife, the lower surface of each of said flanges being rearwardly and downwardly beveled to provide a surface for engaging the rearwardly and downwardly beveled portion of said blade, and a stud extending upwardly from each of the flat surfaces of said base at an intermediate radial portion thereof and spaced substantially forwardly in the direction of rotation of said flange and wall for slidably receiving the groove in the adjacent blade to prevent rearward and lateral movement of the blade, each of said studs having an enlarged head for engaging the upper surface of the adjacent blade at a portion thereof spaced forwardly of said rear portion, said head being spaced from said flat surface in which the stud is mounted by a distance substantially the same as the thickness of the portion of the blade engaged thereby, whereby the blade is held in tight engagement between the head of the stud and the adjacent flat surface of the base.

EDWARD MAY.

REFERENCES CITED

The following references are of record in the file of this patent:

UNITED STATES PATENTS

| Number | Name | Date |
|---|---|---|
| 2,131,429 | Diechmann | Sept. 27, 1938 |
| 2,186,716 | Diechmann | Jan. 9, 1940 |
| 2,259,623 | Diechmann | Oct. 21, 1941 |

FOREIGN PATENTS

| Number | Country | Date |
|---|---|---|
| 432,417 | Great Britain | July 25, 1935 |